US007979222B2

(12) United States Patent
Donde et al.

(10) Patent No.: US 7,979,222 B2
(45) Date of Patent: Jul. 12, 2011

(54) SHORT-TERM LOAD FORECASTING BASED CAPACITY CHECK FOR AUTOMATED POWER RESTORATION OF ELECTRIC DISTRIBUTION NETWORKS

(75) Inventors: Vaibhav Donde, Raleigh, NC (US); Zhenyuan Wang, Cary, NC (US); Mohamed Maharsi, Garner, NC (US); Fang Yang, Raleigh, NC (US); James Stoupis, Durham, NC (US)

(73) Assignee: ABB Research Ltd., Zurich (CH)

( * ) Notice: Subject to any disclaimer, the term of this patent is extended or adjusted under 35 U.S.C. 154(b) by 365 days.

(21) Appl. No.: 12/250,630

(22) Filed: Oct. 14, 2008

(65) Prior Publication Data

US 2010/0094573 A1 Apr. 15, 2010

(51) Int. Cl.
*G01R 22/00* (2006.01)
(52) U.S. Cl. ........................................................ 702/61
(58) Field of Classification Search .................. 702/61
See application file for complete search history.

(56) References Cited

U.S. PATENT DOCUMENTS

| 7,751,166 B2 | 7/2010 | Stoupis et al. |
| 7,860,615 B2 | 12/2010 | Nelson et al. |
| 2007/0049133 A1* | 3/2007 | Conroy et al. ............ 439/894 |

OTHER PUBLICATIONS

G. Peponis, M. Papadopolous, "Reconfiguration of Radial Distribution Networks: Application of Heuristic Methods of Large-Scale Networks," IEEE Proceedings Generation Transmission Distribution, vol. 142, No. 6, Nov. 1995.
Y. Hsu, H. Huang, H. Kuo, et al. "Distribution System Service Restoration Using a Heuristic Search Approach," IEEE Transactions on Power Delivery, vol. 7, No. 2, Apr. 1992.
S. Toune, H. Fudo, T. Genji, et al. "A Reactive Tabu Search for Service Restoration in Electric Power Distribution Systems" IEEE International Conference on Evolutionary Computation, vol. 4, Issue 9, May 1998, p. 763-768.

* cited by examiner

*Primary Examiner* — Tung S Lau
(74) *Attorney, Agent, or Firm* — Michael C. Prewitt; Robert P. Nupp (57) ABSTRACT

A method of forecasting loads on a distribution network is disclosed. The method employs load profiles in combination with short-term load estimations to forecast expected loads on a distribution network. The predicted loads may then be used by power restoration controllers when performing backfeed capacity checks.

17 Claims, 5 Drawing Sheets

|         |                 | 0:00 hour (MW) | 1:00 hour (MW) | ... | 23:00 hour (MW) |
|---------|-----------------|------|------|-----|-------|
| Summer  | Work day        | SW0  | SW1  | ... | SW23  |
| Summer  | Weekend/holiday | SH0  | SH1  | ... | SH23  |
| Winter  | Workday         | WW0  | WW1  | ... | WW23  |
| Winter  | Weekend/holiday | WH0  | WH1  | ... | WH23  |

FIG. 3

| Time stamp | $T_1$ | $T_2$ | ... | $T_N$ |
|---|---|---|---|---|
| Load | $LD_1$ | $LD_2$ | ... | $LD_N$ |
| Network State | $NtSt_1$ | $NtSt_2$ | ... | $NtSt_N$ |

SHORT-TERM LOAD FORECASTING BASED CAPACITY CHECK FOR AUTOMATED POWER RESTORATION OF ELECTRIC DISTRIBUTION NETWORKS

BACKGROUND

Switching devices (hereinafter switches) are used in power distribution networks to isolate faults and restore power, following the occurrence of an abnormality or fault. Switches may include, for example, circuit breakers, reclosers and sectionalizers. The identification of proper switches for fault isolation is relatively easy, whereas the determination of switches and switching sequences for power restoration can be quite complex. Depending on pre-fault network topology, many alternative paths (back-feeding pathways) may be available from which power can flow from an alternative power source, through a series of switches, to one or more disconnected loads. Determining the proper back-feeding pathway is contingent on the available capacities of the back-feed sources, as well as the power handling capacities of the intermediate devices (e.g. power lines, reclosers, switches, and transformers).

Intelligent algorithms may be executed on computer systems to choose the optimal restoration path. These algorithms scan the available back-feed paths and identify those that are capable of providing the additional loads without exceeding the capability limits of the alternate source. Further, the algorithms may check the thermal and other limits of the intermediate lines and devices to ensure safe back-feed operation. Paths that satisfy all such capacity checks are labeled as feasible paths for back-feed. If multiple feasible paths are available for back-feeding of one group of disconnected loads, the best option may be selected. For instance, a best option may be the one that results in the lowest loading of the alternate source. The intelligent algorithms also attempt to ensure that the approved back-feed solution is reliable, will restore the unserved loads without interrupting power to other loads, and that the back-feed network operates safely.

As should be apparent, evaluating alternative back-feed sources requires some knowledge of the loads (e.g. Amps, MW or MVar power) on the network. One method of estimating loads is to simply use the static rated value of the load. The advantage of this procedure is that it is simple and can be programmed offline, as the load rating is known from the network configuration data. In many instances however this procedure may not be sufficient, as the actual load varies with time and may deviate considerably from its rated value. The load rating may also vary from season to season or even from day time to night time. As an example, if a particular load is an industrial facility, a restoration may be carried out at midnight when the rated load demands are low (e.g. 200 A). Given that the load is industrial load, the loads will likely be significantly higher 12 hours later, and the new, larger load may possibly overload the alternative source. If, for example, the rated demand increased to 350 amps during the day, this increase could cause the source to overload. The overloading may trigger further undesirable consequences, such as cascade tripping events and the loss of other sensitive loads. The variation in the load should be taken into consideration while performing the back-feed so that future unwanted consequences are avoided.

Thus, there is a need in the art for a system and method that forecasts loads on a network in an adaptive manner for use in back-feed capacity determinations.

SUMMARY OF THE INVENTION

According to one aspect of the present invention, a method is provided for forecasting the power use of at least one network load in a power distribution network after a fault. The method includes selecting a load profile for the network load. A short-term load estimation is executed for the network load. A first modified load profile is generated by adjusting the load profile by a first safety margin. If the short-term load estimation is less than, or equal to the modified load profile at a corresponding time period, a maximum value of the first modified load profile is determined within a first forecast period. If the short-term load estimation is greater than the first modified load profile at the corresponding time period, a second modified load profile is generated by adjusting the load profile by a second safety margin and a maximum value of the second modified load profile is determined within the first forecast period. The maximum value is thereafter used to determine whether an alternate power source has sufficient capacity to restore power to the network load.

According to another aspect of the present invention, an electronic device is provided that is suitable to communicate with one or more IEDs and for forecasting the power use of a network load in a power distribution network after a fault. The electronic device includes a computer device having code configured to select a load profile for the network load, determine a short-term load estimation for the network load, and generate a first modified load profile by adjusting the load profile by a first safety margin. If the short-term load estimation is less than, or equal to the modified load profile at a corresponding time period, the code is configured to determine a maximum value of the first modified load profile within a first forecast period. If the short-term load estimation is greater than the first modified load profile at the corresponding time period, the code is configured to generate a second modified load profile by adjusting the load profile by a second safety margin and determine a maximum value of the second modified load profile within the first forecast period. The maximum value is used to determine whether an alternate power source has sufficient capacity to restore power to the network load.

BRIEF DESCRIPTION OF THE DRAWING FIGURES

The features, aspects, and advantages of the present invention will become better understood with regard to the following description, appended claims, and accompanying drawings where:

DETAILED DESCRIPTION OF THE ILLUSTRATIVE EMBODIMENT(S)

Figure 1:
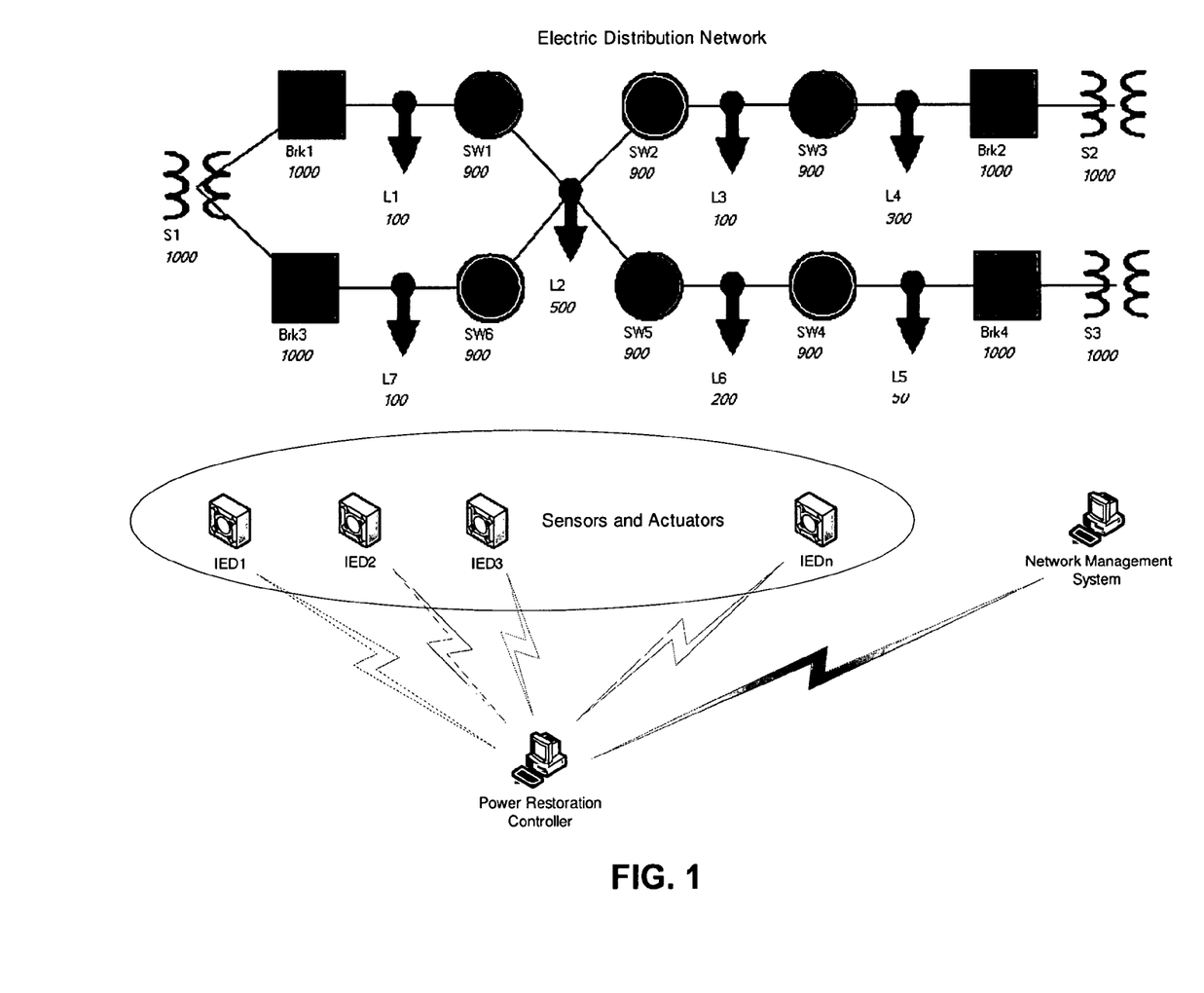
FIG. 1 is a schematic drawing of a distribution network according to the present invention.

With reference now to FIG. 1, an exemplary electric distribution network is shown. The network includes three sources S1-S3, seven loads L1-L7 and various switching devices Brk1-Brk4 and SW1-SW6. Devices SW2, SW4 and SW6 are normally open (NO) tie switches. The tie switches make the network electrically radial, in other words, each load is supplied by only one source. It is important to ensure that the total load supplied by each source and the current flowing through each switching device is less than their respective maximum capacities. As shown in FIG. 1, source S1 serves loads L1, L2, L6 and L7, which total 900 A. This is less than the S1 maximum capacity of 1000 A. Similarly, sources S2 and S3 supply 400 and 50 A of load respectively, which is less than their respective capacities. Furthermore, the current flowing through each switching device is less than its respective maximum load carrying capacity (e.g. 1000 A for Brk1, 900 A for SW1). According to one embodiment, maximum capacity for a source may be the maximum rated current supplying capacity. In other embodiments, the maximum capacity may be another capacity value, such as the actual available capacity based on thermal limits of network paths feeding the loads, and/or network voltage and/or steady state stability constraints.

Each switching device includes an associated IED that acts as a sensor as well as an actuator for control actions. The IEDs sense the voltage and current at their network locations detect faults and send appropriate commands to the associated switches to clear the fault. The IEDs also communicate voltage, current, fault and status data to a power restoration controller (or a group of coordinated controllers) via communication links (wired or wireless). Following a network fault, the power restoration controller executes the restoration algorithms to generate fault isolation and load restoration switching plans. The power restoration controller(s) implements fault clearing, isolation, and out-of-service area restoration by ordering various IEDs to open or close their respective switches.

As an example, if a permanent fault occurs at the load node L1, device Brk1 goes through its reclosing sequence and locks out to clear the fault. Device SW1 locks out as ordered by the power restoration controller to isolate the fault. Following the fault isolation, loads L2 and L6 remain unserved (out-of-service). The power restoration controller has the option of closing any of the three tie switches SW2, SW4 or SW6 to restore power to the unserved loads. A capacity check is performed to determine a feasible option. For example, if SW2 is closed, source S2 supplies the additional load of L2 and L6, which is 700 A. It already supplies L3 and L4, which are 400 A in total. Given that the maximum capacity of source S2 is 1000 A, and the new load is 1100 A, the capacity check would fail.

The capacity check is successful if SW6 is closed to provide a back-feed from source S1, or if SW4 is closed to provide a back-feed from source S3. In the former case, source S1 supplies a total of 800 amps (80% of maximum capacity) and in the latter case, source S3 supplies 750 amps (75% of its maximum capacity). The best option is typically the one that results in the lowest loading of the respective back-feed source, in this case, source S3. As is evident, the accuracy of the load values used by the power restoration controller is highly important when making back-feed path determinations. Though the present invention may be employed to determine load values for any load restoration application, an exemplary method of performing load restoration is U.S. application Ser. No. 11/687,213 titled "Advanced Feeder Architecture with Automated Power Restoration," the disclosure of which is incorporated by reference in its entirety. The determination of the appropriate load values to be used in the restoration controller capacity checks is the primary focus of the present invention, and will be discussed in greater detail below.

Figure 2:
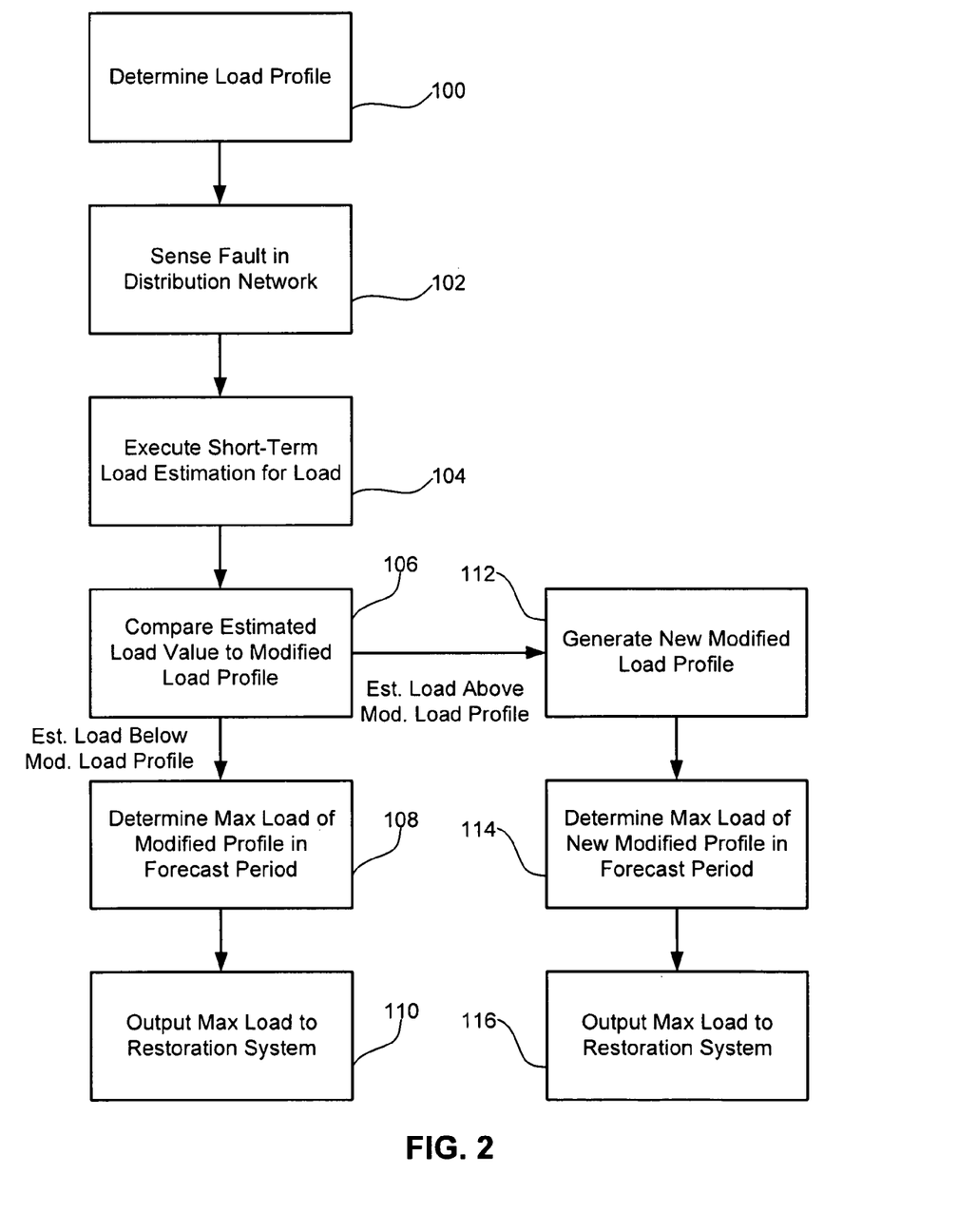
FIG. 2 is a flow-chart showing a load forecasting method according to the present invention.

With reference to FIG. 2, the method of determining a load value according to the present invention is shown. At 100, prior to, or immediately after a fault, an appropriate load profile is determined for at least one load in a distribution network. The load profile plots the power usage of a load over a period of time (typically 24 hours) and may be chosen based on the season (winter/summer) and/or the day of week (weekday/weekend). At 102 a fault in the distribution network is sensed, and at 104 a short-term load estimation is executed based on IED measurements. At 106, the short-term load estimation is compared to a modified load profile (with a predetermined safety margin added) and it is determined whether the load estimation is at or below the modified load profile for the corresponding time period. If so, at 108 it is determined what the maximum current value in the modified load profile is over a forecast period. At 110 the max load value is output to a power restoration system/controller. If the load estimation value is greater than the modified load profile, the load profile safety margin is adjusted and a new modified load profile is generated at 112. The safety margin is adjusted so that the new modified load profile equals the estimated load value at the corresponding time period. Thereafter, at 114 it is determined what the maximum current value in the new modified load profile is over a forecast period. The maximum load value is output to a power restoration controller at 116. For each load in a network wherein a load forecast is needed, the above method is performed. In this manner, accurate load values are provided to the power restoration controller for back-feed capacity calculations.

Figure 3:
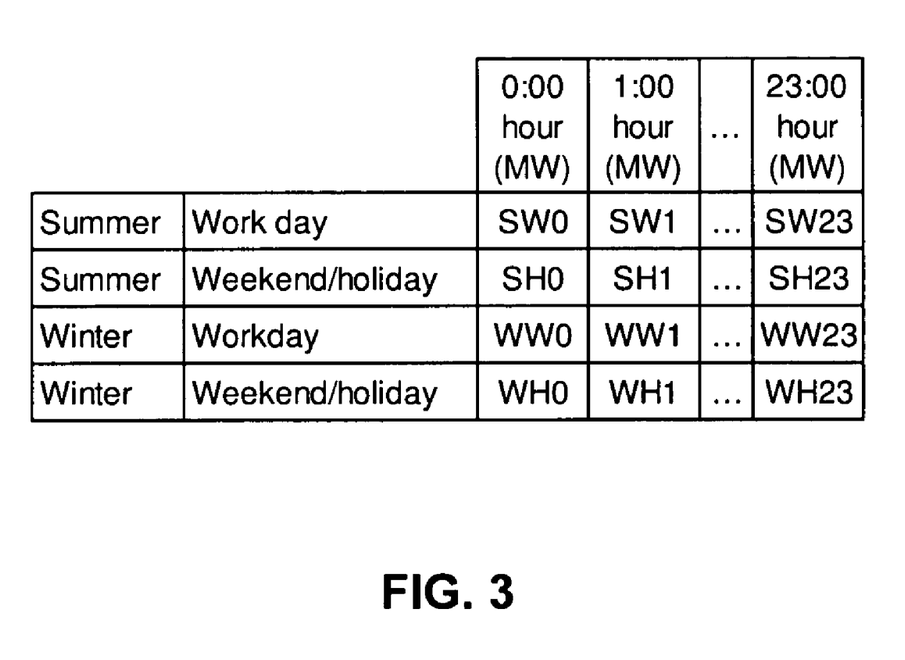
FIG. 3 is an exemplary load profile template.

For purposes of the present disclosure, the term "load" is defined as the aggregation of all loads inside a load zone, which is the area between two adjacent switches. Any of the individual loads in a load zone may be turned on or off separately and thus, the aggregated load varies with time. A load's variation over a period of time is its load profile. Load profiles vary depending on the season, or day of the week (weekend/holiday vs. weekday). With reference now to FIG. 3, a table shows an exemplary load profile template used to store a daily load profile for two seasons. As can be seen, a separate profile is provided for summer weekday, summer weekend/holiday, winter weekday and winter weekend/holiday. In the present example, each individual profile includes an hourly load value for every hour in the day. However, it should be appreciated that other time increments may be used, for example, a load value may be provided every 15 minutes, or every two hours. As will be described later in greater detail, these load profiles are used to determine an appropriate value of the load for capacity checks in feeder restoration. It should also be appreciated that additional profiles may be identified, for example, instead of summer and winter, the profiles may be determined by individual month.

The load profile of a load may come from any number of sources. According to one embodiment, the load profile may be predefined when the restoration controller is configured, using derived information from distribution management system(s). The distribution management system may calculate load profiles based on historical data. According to one embodiment the load profile(s) are derived from the historical average current use of a load. If the information is not immediately available to the restoration controller during configuration, the load profiles may be populated with rated maximum load values, and then populated online over time by the restoration controller. Load profile values may be populated by periodically retrieving load information from IEDs or other sensors and calculating the values for each load. In this manner, each restoration controller has a complete load profile available for every load in a network.

Figure 4:
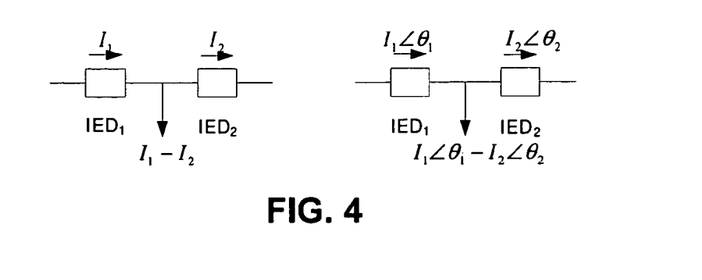
FIG. 4 is a visual representation of Kirchoff's current law.

If a fault occurs, requiring the power restoration controller to determine back-feed paths, a short-term load estimation is determined for all loads in the network. A short-term load estimation is a very recent measurement of the current flowing to a load. The short-term load estimation is possible because each IED records the magnitude of the current flowing therethrough. If the IED currents, the network topology and network status (ON and OFF status of each switch) are all known, a very recent measurement of each system load may be determined. Using Kirchoff's current law, the load currents can be estimated as an algebraic sum of the neighboring IED currents. The algebraic sum requires the knowledge of current directions, which are known because the network is radial and the upstream and downstream feeder section for each IED is known. With reference to FIG. 4, the load current magnitude may be obtained by Kirchoff's current law (see left side of FIG. 4). The load complex power can be computed using the rated voltage of the load and its rated power factor. If the complex IED currents are available for analysis, it is possible to estimate the complex load current (see right side of FIG. 3). This is possible if the IEDs have the functionality of phasor measurement. The complex load powers will provide the estimate of the load MW and MVar online. It should be appreciated that other methods of determining the short-term load estimate are contemplated. For example, the load(s) may be directly measured using an advanced metering infrastructure or any other suitable sensor configuration that directly measures loads.

Figure 5:
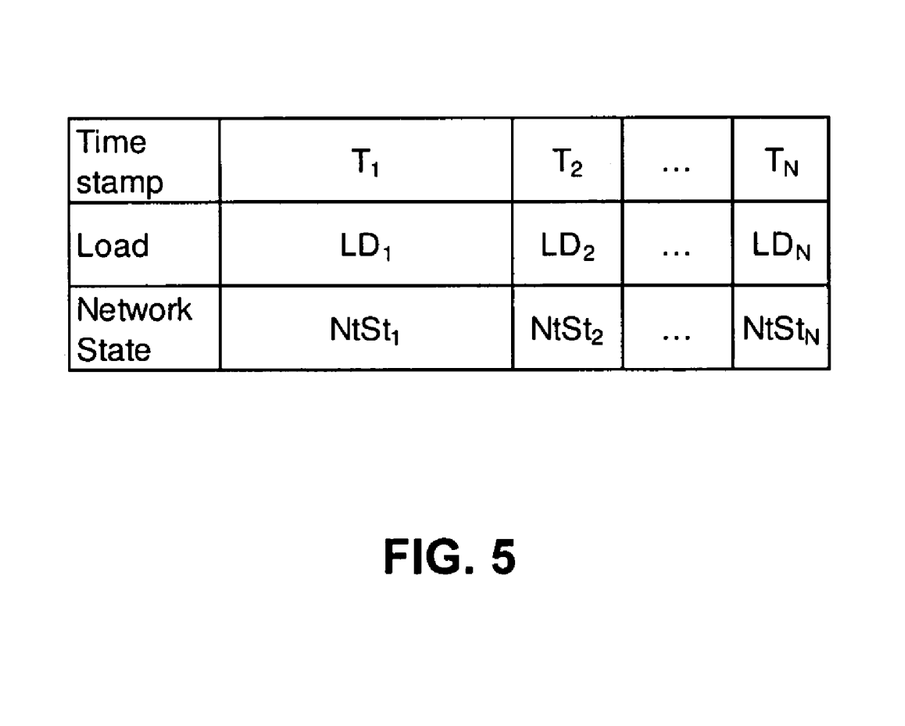
FIG. 5 is an exemplary buffer template.

Short-term load estimation values for each network load may be computed continuously, as described above, and stored in the power restoration controller. In one embodiment, the short-term load estimation values may be stored in a buffer having a first-in-first-out structure and a capacity to store N sample sets. With reference to FIG. 5, a visual representation of the buffer is shown, wherein the buffer includes a plurality of data sets, each data set including a short-term load estimation value for each load in the network (in ampere, per unit or MW), a time stamp and the network state at that time. The network state is an array of the state (ON or OFF) of each switching device in the network. The first-in-first-out (FIFO) buffer is continuously overwritten by newer sample sets over the older sample sets.

As described above, following a fault occurrence in the network, the recloser that is upstream of the fault operates (and locks out) to clear the fault. When the recloser lockout operation is detected by the restoration controller, the network state is updated in the restoration controller to reflect the locked out status of the recloser. This network state may be used to derive the pre-fault network state by resetting in memory the recently operated recloser state to "closed." With reference to FIG. 6, when a fault is recognized, the buffer is searched backwards for the pre-fault network state from the fault detected state. The short-term load estimation value(s) stored at the pre-fault state are chosen and used for forecasting the load, as will be described in greater detail below.

Figure 6:
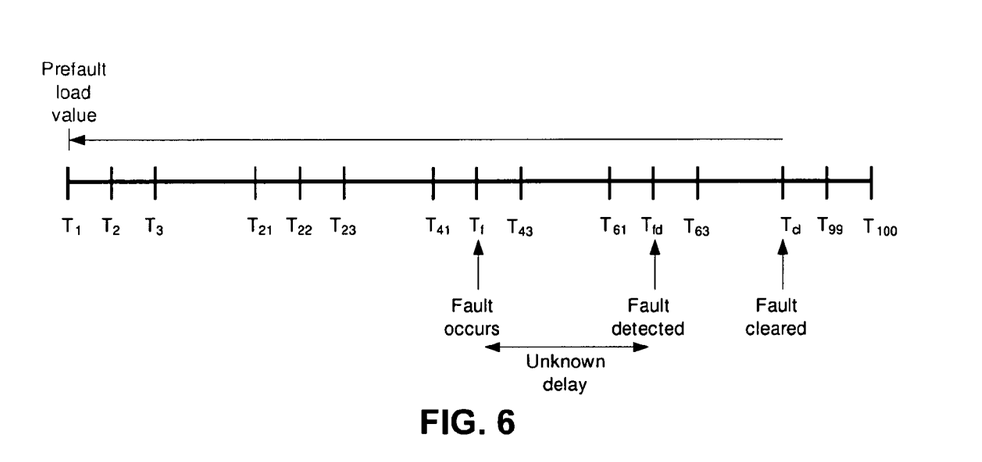
FIG. 6 is a buffer timeline displaying fault occurrence, detection and clearing.

For example, a fault may occur at time $T_f$, be detected by a recloser at time $T_{fd}$ and be cleared at time $T_{cl}$. Starting at time $T_{cl}$ the device locks out and the power restoration controller becomes aware of the fault in the network. The controller determines the pre-fault network status by searching for the earliest occurrence of the network state in the buffer where the locked out recloser is in the closed state. It should be appreciated that shortly before the fault is detected (but after fault occurrence), the recorded network state in the buffer is technically in the pre-fault state. However the corresponding recorded short-term estimated load value will be the after-fault load value, which, because the fault has already occurred, is different from the true pre-fault value. The pre-fault short-term estimated load value corresponds to the time before the fault occurrence. The time delay between the fault occurrence and fault detection is generally unknown because it depends upon delays in the communications and delays in the recloser device. To account for this unknown time delay, the earliest network state that is the same as the pre-fault network state in the buffer is chosen. As shown in FIG. 6, this state occurs at time $T_1$ which is at the first value in the buffer and the pre-fault short-term load estimation value(s) are $LD_1$.

Figure 7:
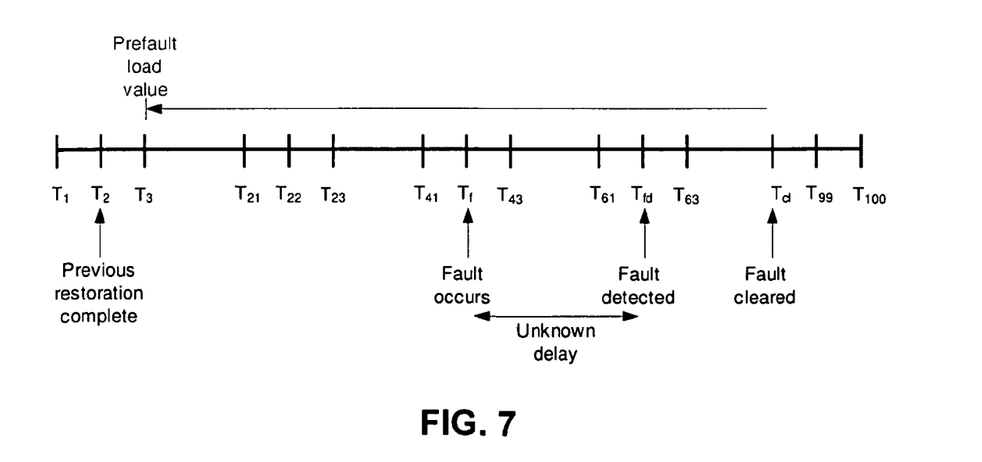
FIG. 7 is a buffer timeline showing a prior restoration event, fault occurrence, detection and clearing.

In some instances, network events occur relatively close in time to each other. For example, the buffer may record a load restoration operation or intentional switching operation due to an earlier fault. With reference to FIG. 7, the earliest network state stored in the buffer that is the same as the pre-fault network state is considered when determining the pre-fault short-term estimated load value. In this example, this corresponds to time $T_3$ and the pre-fault short-term load value(s) are $LD_3$. The size of the buffer and the time interval to record a sample set is determined according to the recloser settings inside the IEDs. The buffer recording time period should preferably be longer than the longest fault clearing sequence of the network.

Figure 8A:
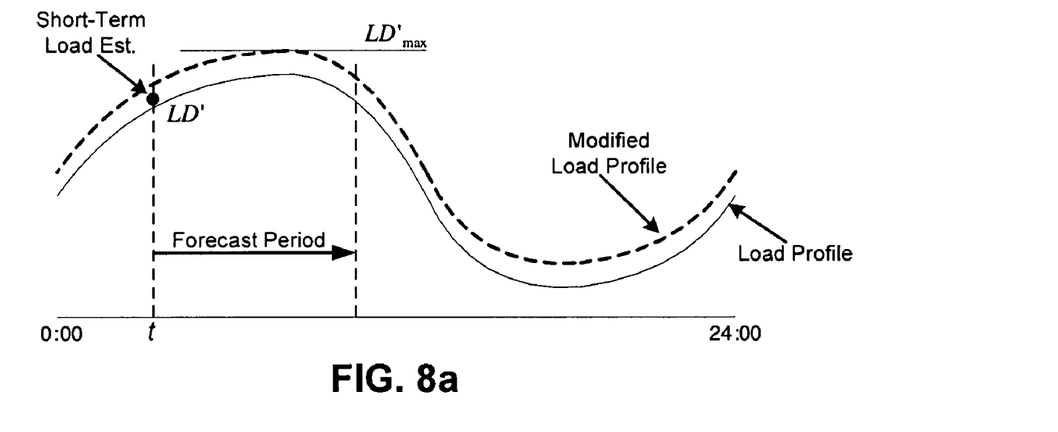
FIG. 8a shows a load profile, modified load profile and a short-term load estimation.
Figure 8B:
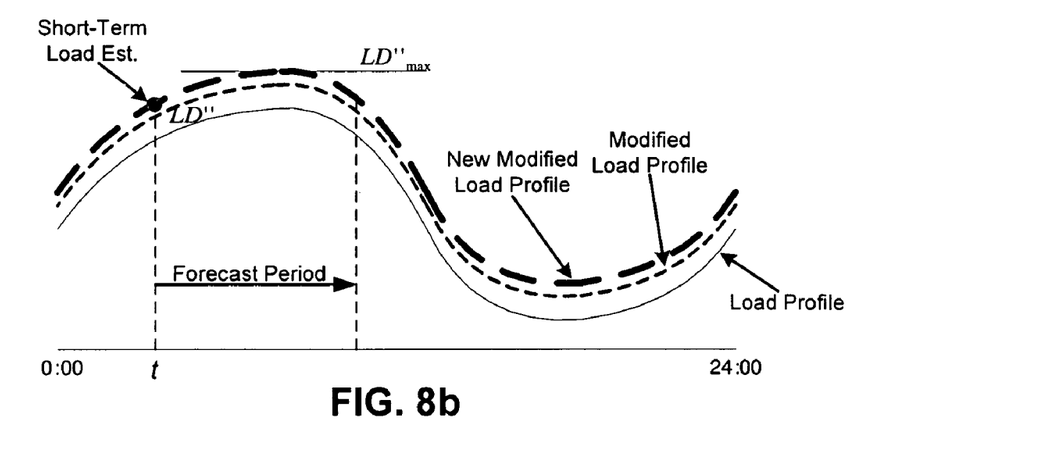
FIG. 8b shows a load profile, modified load profile, new modified load profile and a short-term load estimation.

As will be described hereinafter, the load profile and pre-fault short-term load estimation are used to determine a final load value for one or more loads in the network to be use in the back-feed capacity check. With reference to FIG. 8a, a 24 hour load profile is shown for a load in the distribution network (though other time periods may be used). It is further contemplated that, depending on the length of the forecast period, a plurality of load profiles may be chronologically merged if a fault occurs near a boundary period (i.e. a Friday before a weekend). A modified load profile is generated by increasing the load profile by a safety margin (for example 5%). If, as shown in FIG. 8a, the pre-fault short-term load estimation LD' is less than or equal to the modified load profile at the corresponding time interval t, the maximum load $LD'_{max}$ is determined using the modified load profile. The maximum load $LD'_{max}$ is the maximum load value of the modified load profile over a forecast period. The forecast period may be chosen at the discretion of the network operator. According to one embodiment, the forecast period may be a mean repair time for a faulted network plus a safety margin (the exemplary forecast period shown in FIGS. 8a and 8b is 8 hrs). The maximum load $LD'_{max}$ is the final load value used by the load restoration controller to identify a suitable back-feed, through capacity check functionality. By looking forward in time by the forecast period, maximum load value of a given load is forecast. This final load value is more accurate than static rated values and thus, enables safer back-feeding.

If, as is shown in FIG. 8b, the pre-fault short-term load estimation LD" is greater than the modified profile at the corresponding time interval t, a new safety margin is determined, and a new modified load profile is generated using the new safety margin. The new safety margin is set so that the pre-fault short-term load estimation equals the new modified profile at the corresponding time interval t. The maximum load $LD''_{max}$ is then determined using the new modified load profile. The maximum load $LD''_{max}$ is the maximum load value of the new modified load profile over the forecast period. The maximum load $LD''_{max}$ is the final load used by the load restoration operator to identify a suitable back-feed through capacity check functionality. Again, by looking forward in time by the forecast period, the maximum load value of a given load is forecasted.

The above calculations are performed for at least one load in the distribution network and the final values are made available to the load restoration controller for back-feed capacity checking during load restoration path determination. According to one embodiment, the above calculations are performed for all loads in a distribution network to be made available to a load restoration controller for back-feed capacity checking.

It should be appreciated that, though preferable, it is not required that a safety margin be added to the load profile during the first comparison to the short-term load estimation. According to one embodiment, a safety margin is only added to the load profile if, during the first comparison, the short-term load estimation is greater than the unmodified load profile at the corresponding time. Thereafter, the safety margin is added to the load profile such that the short-term load estimation is equal to the modified load profile at the corresponding time. In this or other embodiments, the safety margin may be adjusted so that the modified or new modified load profile is greater than the short-term load estimation. According to still other embodiments, the safety margin may be adjusted so that the modified load profile or the new modified load profile is greater than the short-term load estimation by a predetermined percentage.

In the above exemplary embodiments shown in FIGS. 8a and 8b, the forecast time period is 8 hours because it is assumed that a faulty section of the network will be safely and definitely repaired in this time. If, however, no feasible back-feed option is available using the final loads determined with a forecast period of 8 hours, the forecast period may be set to a shorter period to determine $LD'_{max}$ or $LD''_{max}$. For instance, if it is known that a fault can be repaired within 6 hours, the forecast period may be set to 6 hours, so that the highest modified load profile value (or new modified load profile value) within 6 hours of the fault is used for capacity check functionality. If time periods less than the default time period are used, an alert or indication may be provided to the operator that the restoration is valid only for the shorter time period. In these or other embodiments, the process may be iterative, in other words, if no back-feed option is available using 8 hours, then the forecast period may be iteratively reduced. For example, the forecast period may be set to 6 hours, then 5 hours, etc. The iteration may progress until a minimum acceptable forecast period is reached or until a valid back-feed configuration is found by the power restoration controller.

In one or more embodiments, if no feasible back-feed path is found to power the unserved loads because of insufficient available capacity, a load management scheme and/or a demand response scheme that limits the load to existing available capacity can be instated through DMS, SCADA, AMI (advanced metering infrastructure), or any other available technologies. Load management schemes may limit overall load through load shedding, while demand response schemes encourage customers to reduce loads willingly by incentivizing voluntary load shedding.

It should be appreciated that network constraints play an important role in determining the real-time source capacity limits. For example, a source may be rated at 1000 A maximum current handling capacity, however the network voltage and steady state stability constraints may limit the actual available capacity to just 700 A. In one or more embodiments, it is preferable that the power restoration controller use the actual source capacity limit in capacity check algorithms, rather than the rated maximum capacity. In these or other embodiments, the restoration controller may communicate with the network management system (NMS) to acquire actual source capacity limits. Referring to FIG. 1, the power restoration controller communicates with the NMS, where the network is analyzed in real-time (using various tools such as power flow and contingency analysis). Using such analysis, the network manager may predict the short-term (hours ahead) actual capacity limit of each potential source. If the power restoration controller attempts to use a source to supply more load than that specified by its capacity limit, the system may suffer from sagging voltages (that may further trigger voltage collapse) or power flow infeasibility. This information may be communicated back to the power restoration controller from the NMS for use in the back-feed and power restoration logic.

As will be appreciated by one of ordinary skill in the art, the present invention may be embodied as or take the form of the method and system previously described, as well as of a computer readable medium having computer-readable instructions stored thereon which, when executed by a processor, carry out the operations of the present inventions as previously described and defined in the corresponding appended claims. The computer-readable medium may be any medium that can contain, store, communicate, propagate, or transport the program instruction for use by or in connection with the forecasting system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), DVD, an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

The invention claimed is:

1. A method of forecasting the power use of at least one network load in a power distribution network after a fault by a processor, the method comprising:

selecting a load profile for the network load;

determining a short-term load estimation for the network load that is a recent pre-fault measurement of the current flowing to the network load;

generating a first modified load profile by adjusting said load profile by a first safety margin;

if said short-term load estimation is less than, or equal to said modified load profile at a corresponding time period, determining a maximum value of said first modified load profile within a first forecast period;

if said short-term load estimation is greater than said first modified load profile at said corresponding time period, generating a second modified load profile by adjusting said load profile by a second safety margin and determining a maximum value of said second modified load profile within said first forecast period; and using said maximum value to determine whether an alternate power source has sufficient capacity to restore power to the network load.

2. The method of claim 1 wherein said load profile is selected based on the season and the day of the week.

3. The method of claim 1 wherein said load profile is derived from historical average current use of a load.

4. The method of claim 1 wherein said step of determining said short-term load estimation includes:
   determining the pre-fault current flowing through an IED immediately upstream of said network load;
   determining the pre-fault current flow through an IED immediately downstream of said network load; and
   subtracting said pre-fault current flowing through said IED immediately downstream of said network load from said pre-fault current flowing through said IED immediately upstream of said network load.

5. The method of claim 1 wherein said second safety margin is a value that adjusts the second modified load profile to equal the short-term load estimation at the corresponding time period.

6. The method of claim 1 wherein said second safety margin is a value that adjusts the second modified load profile be a predetermined percentage greater than the short-term load estimation at the corresponding time period.

7. The method of claim 1, further comprising setting the forecast period to the average time to fix a faulty section of the distribution network.

8. The method of claim 1 wherein if no alternate power source has sufficient capacity to restore power to the network load using said first forecast period, determining said maximum value using a second forecast period that is less than said first forecast period.

9. The method of claim 1 wherein all network loads in said power distribution network are forecast.

10. An electronic device suitable to communicate with one or more IEDs and for forecasting the power use of a network load in a power distribution network after a fault, the electronic device comprising a computer device having code configured to:
    select a load profile for the network load;
    determine a short-term load estimation for the network load that is a recent pre-fault measurement of the current flowing to the network load;
    generate a first modified load profile by adjusting said load profile by a first safety margin;
    if said short-term load estimation is less than, or equal to said modified load profile at a corresponding time period, determine a maximum value of said first modified load profile within a first forecast period;
    if said short-term load estimation is greater than said first modified load profile at said corresponding time period, generate a second modified load profile by adjusting said load profile by a second safety margin and determine a maximum value of said second modified load profile within said first forecast period; and
    use said maximum value to determine whether an alternate power source has sufficient capacity to restore power to the network load.

11. The electronic device of claim 10 wherein said load profile is selected based on the season and the day of the week.

12. The electronic device of claim 10 wherein said load profile is derived from historical average current use of a load.

13. The electronic device of claim 10 wherein said computer device includes code configured to:
    determine the pre-fault current flowing through an IED immediately upstream of said network load;
    determine the pre-fault current flow through an IED immediately downstream of said network load; and
    subtract said pre-fault current flowing through said IED immediately downstream of said network load from said pre-fault current flowing through said IED immediately upstream of said network load to determine said short-term load estimation.

14. The electronic device of claim 10 wherein said second safety margin is a value that adjusts the second modified load profile to equal the short-term load estimation at the corresponding time period.

15. The electronic device of claim 10 wherein said second safety margin is a value that adjusts the second modified load profile be a predetermined percentage greater than the short-term load estimation at the corresponding time period.

16. The electronic device of claim 10, wherein said computer device includes code configured to:
    set the forecast period to the average time to fix a faulty section of the distribution network.

17. The electronic device of claim 10, wherein said computer device includes code configured to:
    determine said maximum value using a second forecast period that is less than said first forecast period if no alternate power source has sufficient capacity to restore power to the network load using said first forecast period.

* * * * *